(12) United States Patent
Saito et al.

(10) Patent No.: US 9,732,676 B2
(45) Date of Patent: Aug. 15, 2017

(54) VALVE CONTROL DEVICE, GAS TURBINE, AND VALVE CONTROL METHOD

(71) Applicant: Mitsubishi Hitachi Power Systems, Ltd., Yokohama-shi, Kanagawa (JP)

(72) Inventors: Akihiko Saito, Tokyo (JP); Takashi Sonoda, Tokyo (JP); Takafumi Uda, Tokyo (JP); Fuminori Fujii, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 635 days.

(21) Appl. No.: 14/348,354

(22) PCT Filed: Nov. 22, 2012

(86) PCT No.: PCT/JP2012/080388
§ 371 (c)(1),
(2) Date: Mar. 28, 2014

(87) PCT Pub. No.: WO2013/080894
PCT Pub. Date: Jun. 6, 2013

(65) Prior Publication Data
US 2014/0230449 A1    Aug. 21, 2014

(30) Foreign Application Priority Data
Nov. 28, 2011  (JP) .................................. 2011-259473

(51) Int. Cl.
*F02C 7/232*    (2006.01)
*F02C 9/28*    (2006.01)
(Continued)

(52) U.S. Cl.
CPC ................ *F02C 7/232* (2013.01); *F02C 7/22* (2013.01); *F02C 9/263* (2013.01); *F02C 9/28* (2013.01);
(Continued)

(58) Field of Classification Search
CPC .... F02C 7/232; F02C 7/22; F02C 9/28; F02C 9/263; F02C 9/32; F02C 9/50; F02C 9/46; F05D 2270/301; F05D 2270/091
See application file for complete search history.

(56) References Cited

U.S. PATENT DOCUMENTS

| 5,272,637 A * | 12/1993 | Urushidani | F02C 9/28 60/243 |
| 2003/0093184 A1 * | 5/2003 | Tanaka | F02C 9/28 700/289 |

(Continued)

FOREIGN PATENT DOCUMENTS

| CN | 1472431 A | 2/2004 |
| JP | 62-197694 A | 9/1987 |

(Continued)

OTHER PUBLICATIONS

Decision to Grant a Patent dated Dec. 8, 2015, issued in counterpart Japanese Patent Application No. 2011-259473. (3 pages). Concise explanation of relevance: a Decision to Grant a Patent has been received.

(Continued)

*Primary Examiner* — Andrew Nguyen
(74) *Attorney, Agent, or Firm* — Westerman, Hattori, Daniels & Adrian, LLP

(57) ABSTRACT

A valve control device is provided in a gas turbine having a combustor for generating combustion gas, a turbine driven by the combustion gas generated by the combustor, a flow rate regulating valve for regulating the flow rate of the fuel to be supplied to the combustor, and a pressure regulating valve disposed upstream of the flow rate regulating valve, for regulating the fuel pressure. The valve control device controls the opening degree of the valve. The valve control device includes a load decrease detection part which detects a load decrease of the gas turbine, and a pressure control part (Continued)

which controls the opening degree of the valve in accordance with the output of the gas turbine. The valve control device suppresses instability of the gas turbine output even when the load rapidly decreases.

4 Claims, 10 Drawing Sheets

(51) Int. Cl.
*F02C 9/50* (2006.01)
*F02C 9/26* (2006.01)
*F02C 7/22* (2006.01)
*F02C 9/32* (2006.01)

(52) U.S. Cl.
CPC .............. *F02C 9/32* (2013.01); *F02C 9/50* (2013.01); *F05D 2220/76* (2013.01); *F05D 2270/02* (2013.01); *F05D 2270/05* (2013.01); *F05D 2270/061* (2013.01); *F05D 2270/091* (2013.01); *F05D 2270/301* (2013.01)

(56) References Cited

U.S. PATENT DOCUMENTS

| 2004/0045275 | A1 | 3/2004 | Tanaka |
| 2008/0071427 | A1 | 3/2008 | Szepek et al. |
| 2011/0056180 | A1 | 3/2011 | Nomura et al. |

FOREIGN PATENT DOCUMENTS

| JP | 63-134825 | A | 6/1988 |
| JP | 63-167033 | A | 7/1988 |
| JP | 03-267528 | A | 11/1991 |
| JP | 2002-138856 | A | 5/2002 |
| JP | 2006-090287 | A | 4/2006 |
| JP | 3828738 | B2 | 10/2006 |
| JP | 3854556 | B2 | 12/2006 |
| JP | 2007-205224 | A | 8/2007 |
| JP | 2010-121598 | A | 6/2010 |

OTHER PUBLICATIONS

Notification of Grant of Invention Patent dated Feb. 2, 2016, issued in counterpart Chinese Patent Application No. 201280044970.0, with English translation. (2 pages). Concise explanation of relevance: a Notification of Grant of Invention Patent has been received.
International Search Report, dated Feb. 12, 2013, issued in corresponding application No. PCT/JP2012/080388.
Written Opinion, dated Feb. 12, 2013, issued in corresponding application No. PCT/JP2012/080388.
Office Action dated Jun. 3, 2015, issued in counterpart Chinese Patent Application No. 201280044970.0, w/English translation (49 pages).
Decision to Grant a Patent dated Feb. 23, 2015, issued in corresponding Korean Patent Application No. 2014-7008203, Explanation of Relevance: "The Decision to Grant has been received". (2 pages).
Extended European Search Report dated May 8, 2015, issued in counterpart European Patent Application No. 12852649.8 (7 pages).

\* cited by examiner

VALVE CONTROL DEVICE, GAS TURBINE, AND VALVE CONTROL METHOD

TECHNICAL FIELD

The present invention relates to a valve control device, a gas turbine, and a valve control method.

BACKGROUND ART

A decrease in gas turbine load during operation of the gas turbine can cause a rapid increase in the rotational speed of the gas turbine.

For example, in a plant including a power generating facility which is grid-connected with a commercial power system and drives a generator by a gas turbine, and a load facility which consumes power, the rotational speed of the gas turbine increases when the power generating facility is isolated from the commercial power system and the power generating facility shifts to isolated operation of transmitting power only to the load facility in the plant. In this case, the demand for gas turbine output rapidly decreases (load decrease) by an amount corresponding to the loss of load under which the power generating facility would otherwise transmit power to the commercial power system. This makes it necessary to rapidly throttle the fuel to be supplied to a combustor of the gas turbine.

In actual operation, however, reduction in the mechanical output of the gas turbine can be delayed due to the following reasons: a delay in detection of the load decrease; supply of the fuel remaining in a fuel passage to the combustor; a delay in action of a flow rate regulating valve for regulating the fuel flow rate or a pressure regulating valve for regulating the fuel pressure; or other causes, which can result in an increase in frequency of the power system in the plant.

Therefore, when a shift to isolated operation occurs, it is necessary to suppress an increase in frequency as well as to secure stability of combustion.

In view of this, PTL 1 describes a gas turbine fuel control device, which, upon occurrence of isolation from a load or isolation from a power transmission system, sets a fuel flow rate in a predetermined premixed combustion fuel system of multiple premixed combustion fuel systems to a predetermined first minimum fuel flow rate required for flame retention, for a first effective time, and sets a fuel flow rate in a diffusion combustion fuel system to a predetermined second minimum fuel flow rate required for flame retention, for a second effective time.

CITATION LIST

Patent Literature

{PTL 1}
The Publication of Japanese Patent No. 3828738

SUMMARY OF INVENTION

Technical Problem

Setting the fuel flow rate to a predetermined value upon occurrence of isolation from the load or isolation from the power transmission system, as described in PTL 1, is effective only if the demanded gas turbine output after isolated operation is always at a fixed value.

However, when the demanded gas turbine output before and after the isolated operation is not at a fixed value, the required fuel amount changes accordingly. In this case, unless an appropriate opening degree of the fuel control valve is set in accordance with the demanded output after isolated operation, frequency variations or combustion instability can be caused.

The present invention has been made in consideration of this situation, and an object thereof is to provide a valve control device, a gas turbine, and a valve control method, which can suppress instability of the gas turbine output even when the load rapidly decreases.

Solution to Problem

In order to make an improvement in the above situation, a valve control device, a gas turbine, and a valve control method of the present invention have adopted the following solutions.

According to a first aspect of the present invention, there is provided a valve control device disposed in a gas turbine, the gas turbine comprising: a combustor for generating combustion gas by combusting fuel; a turbine driven by the combustion gas generated by the combustor; a flow rate regulating valve for regulating a flow rate of the fuel to be supplied to the combustor; and a pressure regulating valve disposed upstream of the flow rate regulating valve in a fuel passage for supplying the fuel to the combustor, for regulating the fuel pressure, wherein the valve control device controls at least opening degree of the pressure regulating valve, the valve control device comprising: a detection section for detecting a load decrease of the gas turbine; and a pressure control section for controlling the opening degree of the pressure regulating valve on the basis of an output value of the gas turbine after the load decreases when the detection section detects the load decrease.

According to this configuration, the valve control device is disposed in the gas turbine, and the gas turbine comprises the following elements: the combustor for generating the combustion gas by combusting the fuel; the turbine driven by the combustion gas generated by the combustor; the flow rate regulating valve for regulating the flow rate of the fuel to be supplied to the combustor; and the pressure regulating valve for regulating the fuel pressure, disposed upstream of the flow rate regulating valve in the fuel passage for supplying the fuel to the combustor, and the valve control device controls at least the opening degree of the pressure regulating valve.

Then, the detection section detects a load decrease of the gas turbine. When the gas turbine load decreases and the fuel amount fails to be reduced in a desired time period in accordance with the load, the gas turbine output can become unstable.

Here, the fuel flow rate is regulated by feedback control of the opening degree of the flow rate regulating valve, for example, on the basis of the gas turbine output. However, even when the feedback control is performed on the flow rate regulating valve on the basis of the gas value after the load decrease, an increase in the frequency or combustion instability cannot be suppressed unless the pressure regulating valve disposed upstream of the flow rate regulating valve is at an appropriate opening degree.

Therefore, upon detection of a load decrease by the detection section, the opening degree of the pressure regulating valve is controlled by the pressure control section in accordance with the gas turbine output after the load decrease. The control in accordance with the gas turbine output after the load decrease refers namely to feedforward control. In this way, when the gas turbine load decreases, control is performed such that the pressure regulating valve regulates the fuel pressure to an appropriate value corresponding to the load. This makes it possible to control such that the flow rate regulating valve disposed downstream of the pressure regulating valve regulates the fuel flow rate to an appropriate value corresponding to the load.

Thus, this configuration can suppress instability of the gas turbine output even when the load rapidly decreases.

In the first aspect, it is preferable that the pressure control section obtains a fuel demand value indicating an amount of the fuel to be supplied to the combustor on the basis of an output demand value for the gas turbine after the load decrease, and determines the opening degree of the pressure regulating valve on the basis of the fuel demand value.

According to this configuration, since the fuel demand value indicating the amount of fuel to be supplied to the combustor is obtained in accordance with the output demand value of the gas turbine after the load decrease, and the opening degree of the pressure regulating valve is determined on the basis of the fuel demand value, the opening degree of the pressure regulating valve after the load decrease can be precisely determined.

In the first aspect, it is preferable that the valve control device further includes an air flow rate calculation section for calculating a flow rate of air to be fed to a compressor on the basis of the output demand value, the compressor introducing compressed air into the combustor, wherein the pressure control section derives the fuel demand value corresponding to the air flow rate calculated by the air flow rate calculation section, atmospheric temperature, and the output demand value, by using heat balance data indicating at least one of state values at inlets and outlets of components constituting the gas turbine.

According to this configuration, the flow rate of the air to be fed to the compressor, which introduces the compressed air into the combustor, is calculated by the air flow rate calculation section on the basis of the output demand value of the gas turbine. Then, the fuel demand value is derived, as a value corresponding to the air flow rate calculated by the air flow rate calculation section, the atmospheric temperature, and the output demand value of the gas turbine, from the heat balance data indicating at least one of the state values at the inlets and outlets of the components constituting the gas turbine.

Thus, in this configuration, since the fuel demand value corresponding to the output demand value of the gas turbine after the load decrease is obtained from the heat balance of the gas turbine, and the opening degree of the pressure regulating valve is determined accordingly, the opening degree of the pressure regulating valve after the load decrease can be precisely determined.

In the first aspect, it is preferable that the pressure control section derives the fuel demand value corresponding to the output demand value by using first information indicating a relation between the output demand value and the fuel demand value.

According to this configuration, the fuel demand value is derived from the first information indicating the relation between the output demand value and the fuel demand value of the gas turbine after the load decrease, and the opening degree of the pressure regulating valve is determined accordingly. Since the amount of calculations performed to determine the opening degree of the pressure regulating valve can be reduced, the opening degree of the pressure regulating valve after the load decrease can be determined in a simple configuration.

In the first aspect, it is preferable that the pressure control section derives the opening degree corresponding to the output demand value by using second information indicating a relation between the output demand value of the gas turbine and the opening degree of the pressure regulating valve.

According to this configuration, the opening degree of the pressure regulating valve is derived from the second information indicating the relation between the output demand value of the gas turbine and the opening degree of the pressure regulating valve. Since the amount of calculations performed to determine the opening degree of the pressure regulating valve is reduced, the opening degree of the pressure regulating valve after the load decrease can be determined in a simple configuration.

In the first aspect, it is preferable that the pressure control section corrects the derived opening degree on the basis of parameters influencing a combustion state in the combustor.

According to this configuration, since the opening degree of the pressure regulating valve derived by using the second information is corrected on the basis of the parameters influencing the combustion state in the combustor, the opening degree of the pressure regulating valve after the load decrease can be precisely determined. The above-mentioned parameters include atmospheric temperature, a fuel calorific value, fuel temperature, and fuel supply pressure.

In the first aspect, it is preferable that the pressure control section determines the opening degree of the pressure regulating valve by using a command value and on the basis of the fuel demand value derived from third information indicating a relation between the command value and the fuel demand value indicating an amount of the fuel to be supplied to the combustor, the command value indicating the fuel flow rate calculated on the basis of rotational speed of the gas turbine after the load decrease.

According to this configuration, since the fuel demand value is calculated by using the command value indicating the fuel flow rate calculated on the basis of the rotational speed of the gas turbine after the load decrease, the opening degree of the pressure regulating valve after the load decrease can be more precisely determined. As the opening degree of the flow rate regulating valve corresponds to the fuel flow rate, the above-mentioned command value also includes the opening degree of the flow rate regulating valve.

In the first aspect, it is preferable that the pressure control section controls the opening degree of the pressure regulating valve on the basis of the gas turbine output value after the load decrease when the amount of the load decrease exceeds a predetermined threshold value.

Since the pressure regulating valve is not controlled in accordance with the load decrease if the amount of the load decrease is small, this configuration can suppress the risk of flame-out, etc. caused by controlling the pressure regulating valve in accordance with the load decrease.

According to a second aspect of the present invention, there is provided a gas turbine including: a combustor for generating combustion gas by combusting fuel; a turbine driven by the combustion gas generated by the combustor; a flow rate regulating valve for regulating flow rate of the fuel to be supplied to the combustor; a pressure regulating valve disposed upstream of the flow rate regulating valve, for regulating fuel pressure; and the valve control device configured in accordance with any one of claims 1 to 8, for controlling the opening degree of the pressure regulating valve.

According to a third aspect of the present invention, there is provided a valve control method disposed in a gas turbine including the following elements: a combustor for generating combustion gas by combusting fuel; a turbine driven by the combustion gas generated by the combustor; a flow rate regulating valve for regulating the flow rate of the fuel to be supplied to the combustor; and a pressure regulating valve for regulating the fuel pressure, disposed upstream of the flow rate regulating valve in a fuel passage for supplying the fuel to the combustor, the valve control method controlling at least the opening degree of the pressure regulating valve, wherein the valve control method includes the following: a first step of detecting a load decrease of the gas turbine; and a second step of, upon detection of the load decrease, controlling the opening degree of the pressure regulating valve in accordance with the gas turbine output after the load decrease.

Advantageous Effects of Invention

According to the present invention, an advantage of suppressing instability of gas turbine output even when the load rapidly decreases is obtained.

DESCRIPTION OF EMBODIMENTS

An embodiment of a valve control device, a gas turbine, and a valve control method according to the present invention will be described below with reference to the drawings.

(First Embodiment)

Figure 1:
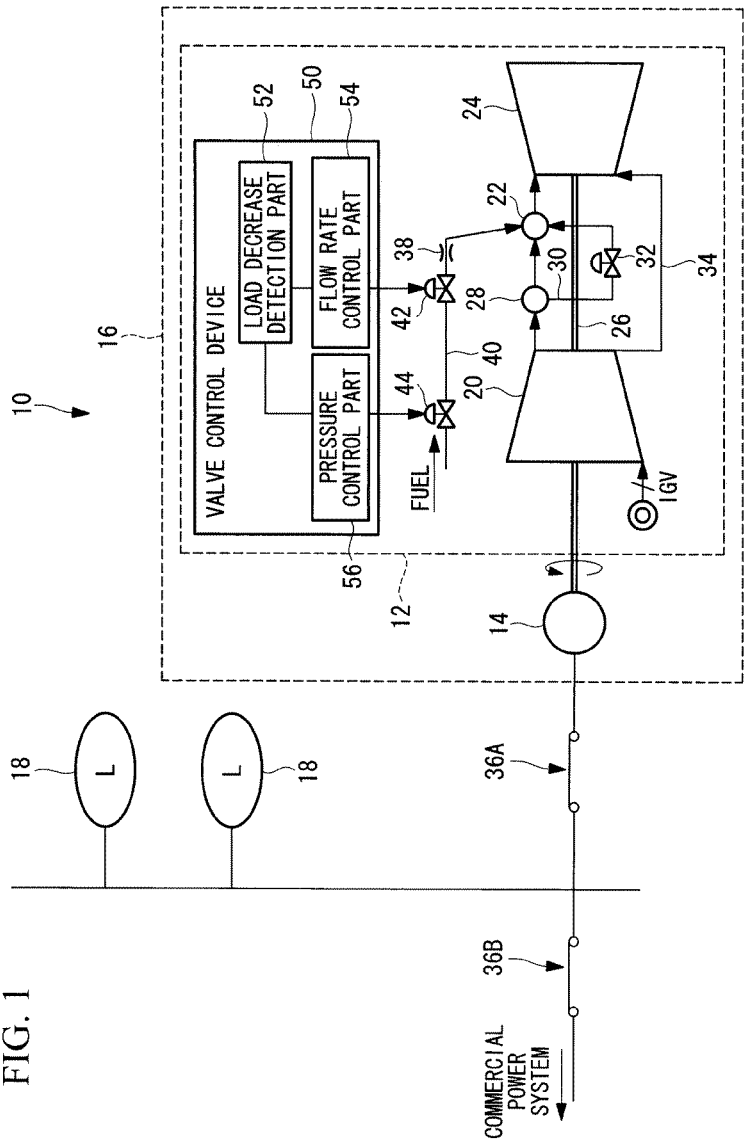
FIG. 1 is a configuration diagram of a plant according to a first embodiment of the present invention.

FIG. 1 is a configuration diagram of an entire plant 10 according to a first embodiment. The plant 10 includes the following elements: a power generating facility 16 constituted of a gas turbine 12 and a generator 14; and load facilities 18 consuming power.

The gas turbine 12 includes a compressor 20, a combustor 22, and a turbine 24.

The compressor 20 is driven by a rotating shaft 26 and thereby compresses air suctioned from an air intake port and generates compressed air. The combustor 22 injects fuel to the compressed air which is introduced from the compressor 20 into a casing 28, and generates high-temperature, high-pressure combustion gas. The turbine 24 is driven to rotate by the combustion gas generated in the combustor 22. The amount of air suctioned into the compressor 20 is regulated by opening and closing of an inlet guide vane (hereinafter referred to as "IGV") provided at an inlet of the compressor 20.

A bypass pipe 30 is provided between the casing 28 and the combustor 22, and when the air inside the combustor 22 becomes insufficient due to load variations of the turbine 24, the bypass pipe 30 serves as a passage for introducing the air in the casing 28 into the combustor 22 upon opening of a combustor bypass valve 32. A bleed pipe 34 is provided between the compressor 20 and the turbine 24 for introducing cooling air from the compressor 20 into the turbine 24.

The turbine 24, the compressor 20, and the generator 14 are coupled together by the rotating shaft 26, and rotary drive force generated in the turbine 24 is transmitted by the rotating shaft 26 to the compressor 20 and the generator 14. Then, the generator 14 generates power by the rotary drive force of the turbine 24. The generator 14 is connected with the load facilities 18 and supplies generated power to the load facilities 18 in the plant 10. The generator 14 is also grid-connected with a commercial power system, and supplies generated power to the commercial power system which is a power grid outside the plant 10.

A breaker 36A is provided in a power transmission line between the power generating facility 16 and the load facilities 18, while a breaker 36B is provided in a power transmission line between the power generating facility 16 and the commercial power system.

The combustor 22 has a nozzle 38 and combusts the fuel supplied through the nozzle 38 by using the compressed air.

A fuel passage 40 for supplying the fuel to the combustor 22 is provided with a flow rate regulating valve 42 for regulating the flow rate of the fuel to be supplied to the combustor 22, and a pressure regulating valve 44 which is for regulating the fuel pressure and disposed upstream of the flow rate regulating valve 42 in the fuel passage 40. The amount of fuel to be supplied to the combustor 22 is controlled as the opening degrees of the flow rate regulating valve 42 and the pressure regulating valve 44 are controlled.

A valve control device 50 includes a load decrease detection part 52, a flow rate control part 54, and a pressure control part 56.

The load decrease detection part 52 detects a decrease in the load (hereinafter referred to as "load decrease") of the gas turbine 12.

The flow rate control part 54 controls the opening degree of the flow rate regulating valve 42 and thereby controls the flow rate of the fuel to be supplied to the combustor 22. More specifically, the flow rate control part 54 controls the fuel flow rate by performing feedback control of the opening degree of the flow rate regulating valve 42 on the basis of the output of the gas turbine 12.

The pressure control part 56 controls the opening degree of the pressure regulating valve 44 and thereby controls the pressure of the fuel to be supplied to the combustor 22. More specifically, the pressure control part 56 controls the opening degree of the pressure regulating valve 44 such that the pressure of the fuel flowing through the fuel passage 40 is at a predetermined value.

The cases where the load of the gas turbine 12 decreases include, for example, a case where power supply from the power generating facility 16 to the commercial power system is cut off, due to a break in the power transmission line between the power generating facility 16 and the commercial power system, opening of the breaker 36B, or other causes. In such cases, the load of the gas turbine 12 rapidly decreases.

Figure 2:
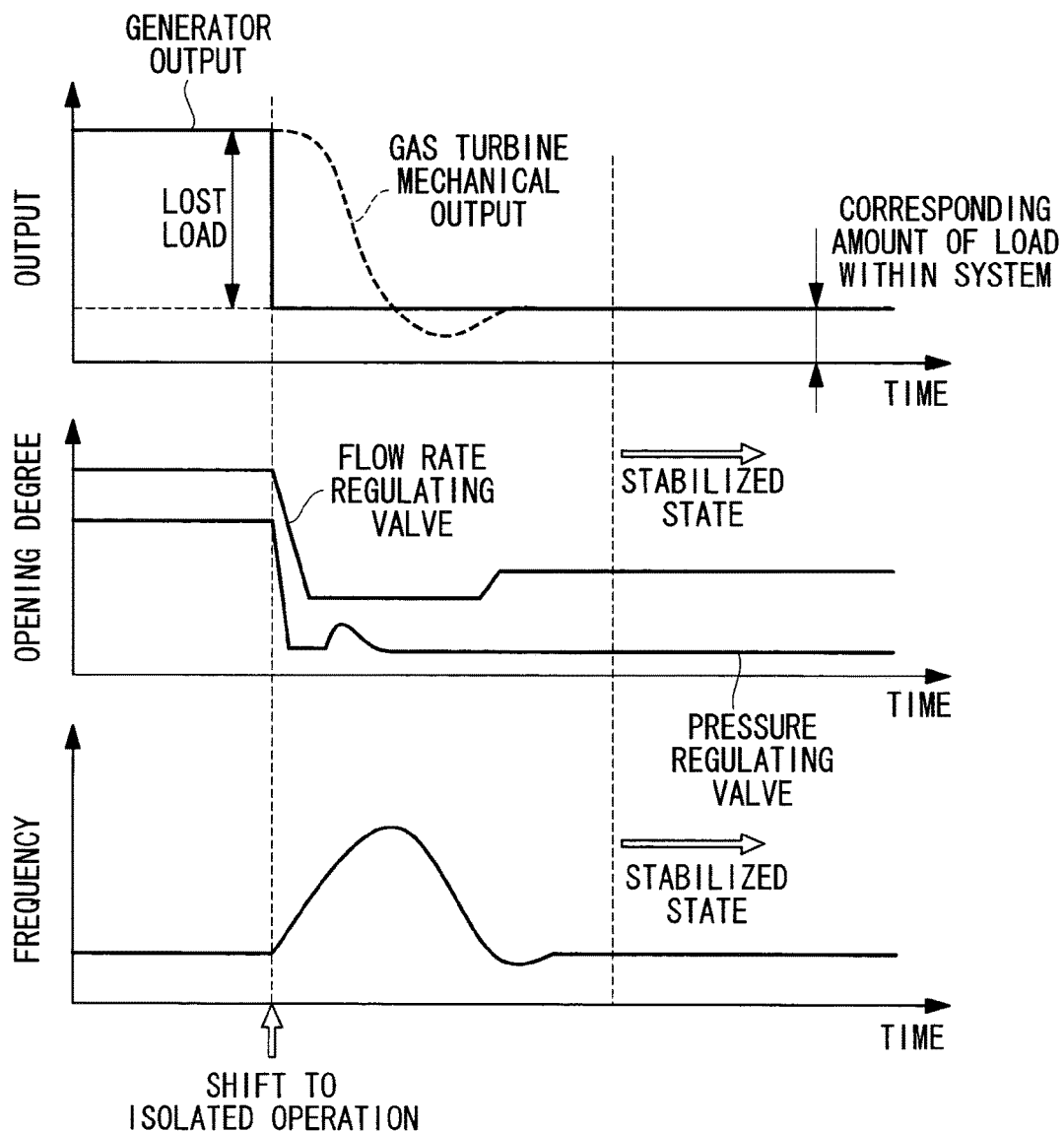
FIG. 2 is a graph showing an example of a change in gas turbine output upon occurrence of a load decrease.

Referring to FIG. 2, a change in the output of the gas turbine 12 upon occurrence of a load decrease will now be described, by taking the case for example where power supply to the commercial power system is cut off.

When the power supply to the commercial power system is cut off, the power generating facility 16 shifts to isolated operation of transmitting power only to the load facilities 18 in the plant 10. As shown in FIG. 2, this causes a rapid decrease in the output of the gas turbine 12 by an amount corresponding to the loss of load (lost load) under which the power would otherwise be transmitted to the commercial power system. In other words, the output demand for the gas turbine 12 becomes an amount corresponding to the load possessed by the load facilities 18 (load within the system).

The opening degrees of the flow rate regulating valve 42 and the pressure regulating valve 44 are throttled in accordance with the load decrease to reduce the fuel to be supplied to the combustor 22. In an actual operation, however, reduction of the mechanical output of the gas turbine 12 can be delayed due to a delay in detection of the load decrease, supply of the fuel remaining in the fuel passage 40 to the combustor 22, a delay in action of the flow rate regulating valve 42 or the pressure regulating valve 44, or other causes, which can result in an increase in frequency of the power system in the plant 10.

Even when the opening degree of the flow rate regulating valve 42 is throttled, if throttling of the pressure regulating valve 44 disposed upstream of the flow rate regulating valve 42 is delayed, the amount of fuel supplied to the combustor 22 becomes larger than expected due to the increased fuel pressure, causing a further increase in the frequency. On the other hand, excessively throttling the fuel deteriorates the combustion stability and can result in flame-out.

Figure 3:
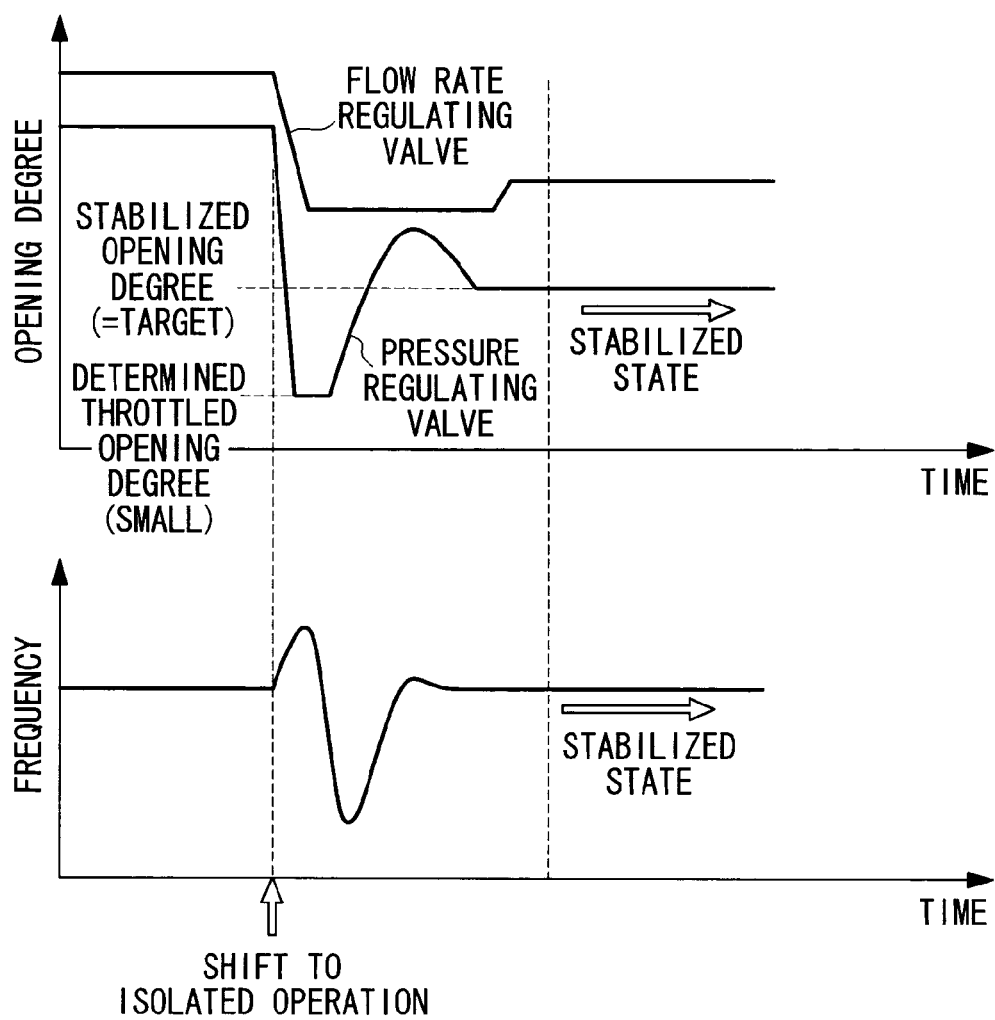
FIG. 3 is a graph showing an example of a change in frequency of a power system in a plant upon occurrence of a load decrease, in a case where a specified throttle opening degree of a pressure regulating valve is small.

FIG. 3 is a graph showing an example of a change in the frequency of the power system in the plant 10 upon occurrence of a load decrease, in a case where a determined throttled opening degree of the pressure regulating valve 44 is small. As shown in FIG. 3, if the opening degree of the pressure regulating valve 44 after the load decrease is small, the pressure of the fuel supplied to the combustor 22 decreases, and accordingly, the amount of fuel becomes too small relative to the load, and therefore the frequency can significantly decrease after increasing with the load decrease.

Figure 4:
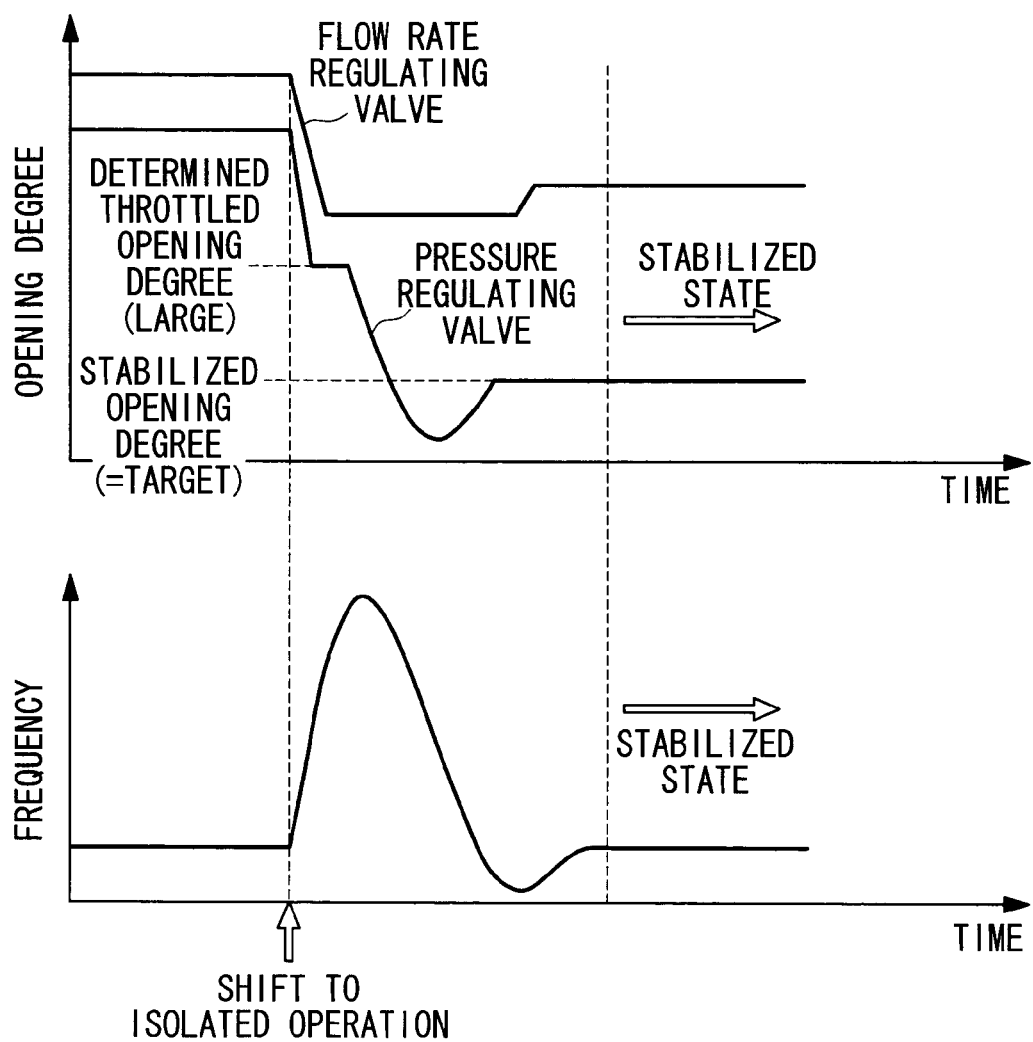
FIG. 4 is a graph showing an example of a change in the frequency of the power system in the plant upon occurrence of a load decrease, in a case where the specified throttle opening degree of the pressure regulating valve is large.

FIG. 4 is a graph showing an example of a change in the frequency of the power system in the plant 10 upon occurrence of a load decrease, in a case where the determined throttled opening degree of the pressure regulating valve 44 is large. As shown in FIG. 4, when the opening degree of the pressure regulating valve 44 after the load decrease is large, the pressure of the fuel supplied to the combustor 22 decreases insufficiently, and accordingly, the fuel amount becomes too large relative to the load, and therefore the frequency can significantly increase with the load decrease.

As shown in FIG. 3 and FIG. 4, even when feedback control is performed on the flow rate regulating valve 42 on the basis of the output of the gas turbine 12 after the load decrease, an increase in the frequency or combustion instability cannot be suppressed unless the pressure regulating valve 44 disposed upstream of the flow rate regulating valve 42 is at an appropriate opening degree.

Therefore, upon detection of a load decrease of the gas turbine 12 by the load decrease detection part 52, the pressure control part 56 according to the first embodiment of the present invention performs load-decrease opening degree control for controlling the opening degree of the pressure regulating valve 44 in accordance with the output of the gas turbine 12 after the load decrease. The load-decrease opening degree control according to the first embodiment obtains a fuel demand value indicating an amount of fuel to be supplied to the combustor 22 in accordance with an output demand value of the gas turbine 12 (hereinafter referred to as "GT output demand value") after the load decrease, and determines the opening degree of the pressure regulating valve 44 on the basis of the fuel demand value.

Figure 5:
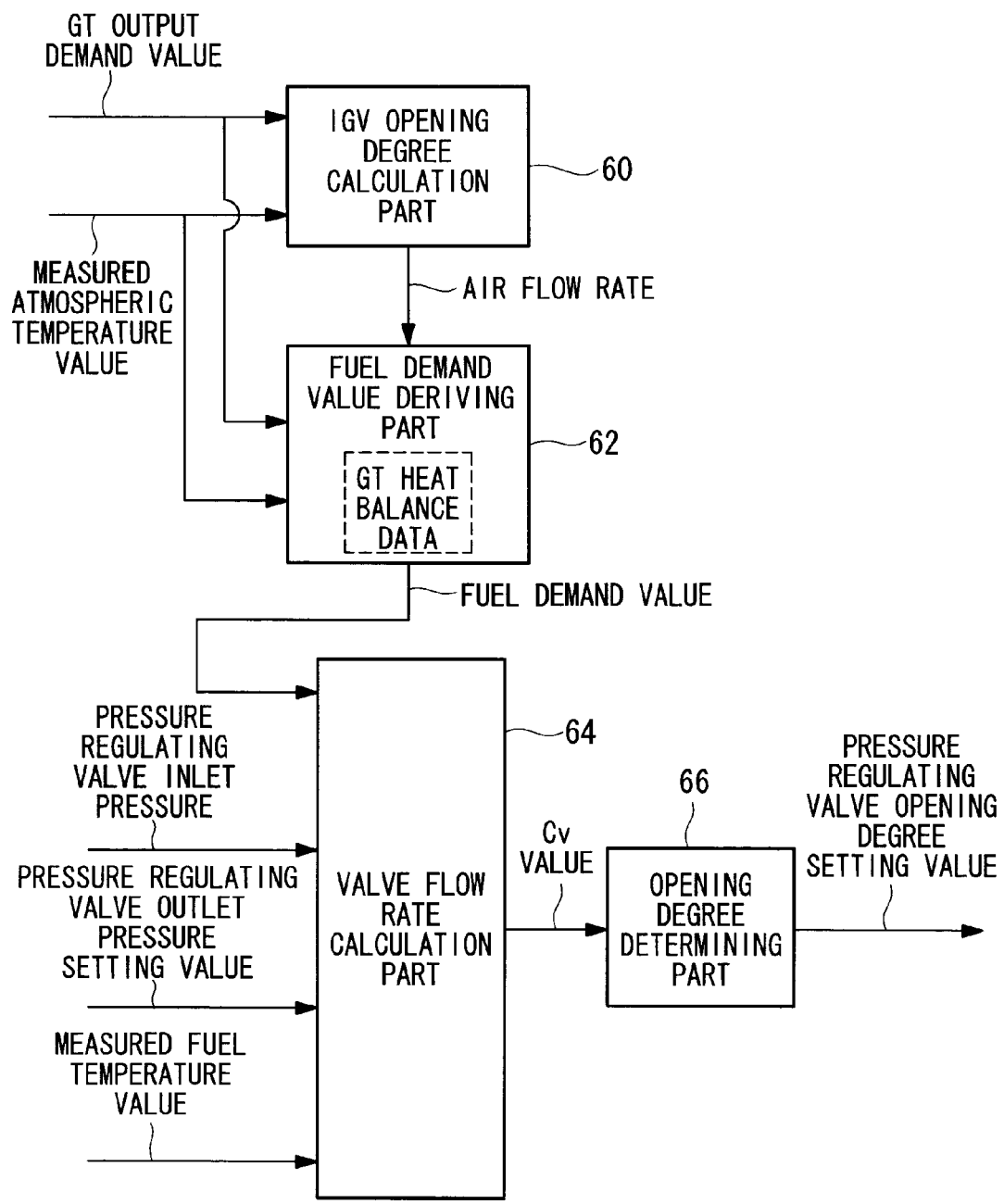
FIG. 5 is a function block diagram showing a function of a pressure control part for performing load-decrease opening degree control according to the first embodiment of the present invention.

FIG. 5 is a function block diagram showing a function of the pressure control part 56 for performing the load-decrease opening degree control according to the first embodiment.

The pressure control part 56 includes an IGV opening degree calculation part 60, a fuel demand value deriving part 62, a valve flow rate calculation part 64, and an opening degree determining part 66.

The GT output demand value and a measured atmospheric temperature value, which is a measurement result of the atmospheric temperature, are inputted into the IGV opening degree calculation part 60. Then, the IGV opening degree calculation part 60 calculates the flow rate of the air to be fed to the compressor 20 on the basis of the GT output demand value and the measured atmospheric temperature value, and calculates the opening degree of the IGV corresponding to the calculated air flow rate.

The fuel demand value deriving part 62 derives the fuel demand value corresponding to the air flow rate calculated by the IGV opening degree calculation part 60, the measured atmospheric temperature value, and the GT output demand value, by using GT heat balance data indicating state values (temperature, pressure, enthalpy, flow rate, etc.) at inlets and outlets of components constituting the gas turbine 12. The GT heat balance data is created in advance as design values of the gas turbine 12 and stored in the fuel demand value deriving part 62.

To determine the opening degree of the pressure regulating valve 44 corresponding to the fuel demand value, the pressure control part 56 calculates a Cv value in the valve flow rate calculation part 64.

The valve flow rate calculation part 64 calculates a Cv value of the pressure regulating valve 44 on the basis of the fuel demand value derived in the fuel demand value deriving part 62, inlet pressure of the pressure regulating valve 44 (supply pressure of the fuel to the pressure regulating valve 44), a set value of outlet pressure of the pressure regulating valve 44, and a measured value of the fuel temperature.

The Cv value is calculated, for example, using a general formula as shown in Formula 1, where the fuel demand value is W, a difference between the inlet pressure and the outlet pressure in the pressure regulating valve 44 is $\Delta P$, and the fuel temperature is T:

[Formula 1]

$$W = Cv\sqrt{\frac{\Delta P}{T}} \quad (1)$$

Table information A (table function) indicating a relation between the Cv value and the opening degree of the pressure regulating valve 44 is stored in advance in the opening degree determining part 66. Then, the opening degree determining part 66 determines the opening degree corresponding to the Cv value, calculated in the valve flow rate calculation part 64, as the opening degree of the pressure regulating valve 44 and sends a valve opening degree setting value indicating the determined opening degree to the pressure regulating valve 44.

The load decrease detection part 52 sends an instruction for execution of the load-decrease opening degree control to the pressure control part 56, if the load decrease amount exceeds a predetermined threshold value. In this way, when the load decrease amount is small, the valve control device 50 according to the first embodiment does not perform the load-decrease opening degree control on the pressure regulating valve 44. Accordingly, the risk of flame-out, etc. caused by controlling the pressure regulating valve 44 in accordance with the load decrease can be suppressed.

Figure 6:
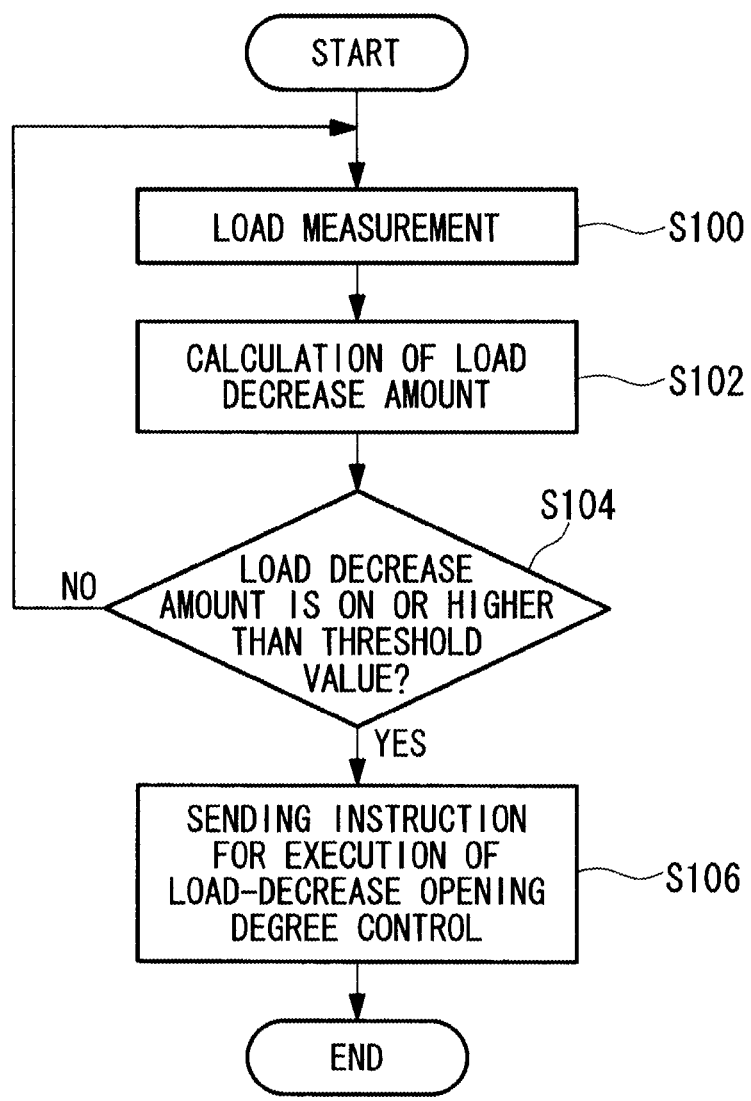
FIG. 6 is a flowchart showing a flow of processing by a load decrease detection part according to the first embodiment of the present invention.

FIG. 6 is a flowchart showing a flow of processing by the load decrease detection part 52 according to the first embodiment.

First, in step 100, the load of the gas turbine 12 is measured. The load is measured, for example, by detecting the output of the generator 14 (hereinafter referred to as "generator output"), and the detected value of the generator output is sequentially stored.

In the next step 102, a difference between the detected current generator output and a generator output detected a predetermined time (e.g., one second) earlier is calculated as the load decrease amount.

In the next step 104, it is determined whether the calculated load decrease amount is on or higher than the threshold value. If the determination results in the affirmative, the flow proceeds to step 106, while if it results in the negative, the flow returns to step 100. The threshold value is, for example, an expected loss of the load when the power generating facility 16 is isolated from the commercial power system.

In step 106, the instruction for execution of the load-decrease opening degree control is sent to the pressure control part 56.

Upon receipt of the instruction for execution of the load-decrease opening degree control, the pressure control part 56 controls the opening degree of the pressure regulating valve 44 in accordance with the output of the gas turbine 12 after the load decrease.

As mentioned above, the pressure control part 56 according to the first embodiment calculates the flow rate of the air to be fed to the compressor 20 on the basis of the GT output demand value and the measured atmospheric temperature value, and derives the fuel demand value, by using the GT heat balance data, as a value corresponding to the calculated air flow rate, the measured atmospheric temperature value, and the GT output demand value. Then, the pressure control part 56 determines the opening degree of the pressure regulating valve 44 corresponding to the fuel demand value, and sends the valve opening degree setting value indicating the determined opening degree to the pressure regulating valve 44.

Upon receipt of the valve opening degree setting value, the pressure regulating valve 44 is regulated to the opening degree as indicated by the valve opening degree setting value.

The load-decrease opening degree control refers namely to feedforward control on the pressure regulating valve 44. In this way, when the load of the gas turbine 12 decreases, the fuel pressure is controlled to an appropriate value, which corresponds to the load, by the pressure regulating valve 44. This makes it possible to control such that the flow rate regulating valve 42 disposed downstream of the pressure regulating valve 44 controls the fuel flow rate to an appropriate value corresponding to the load.

Figure 7:
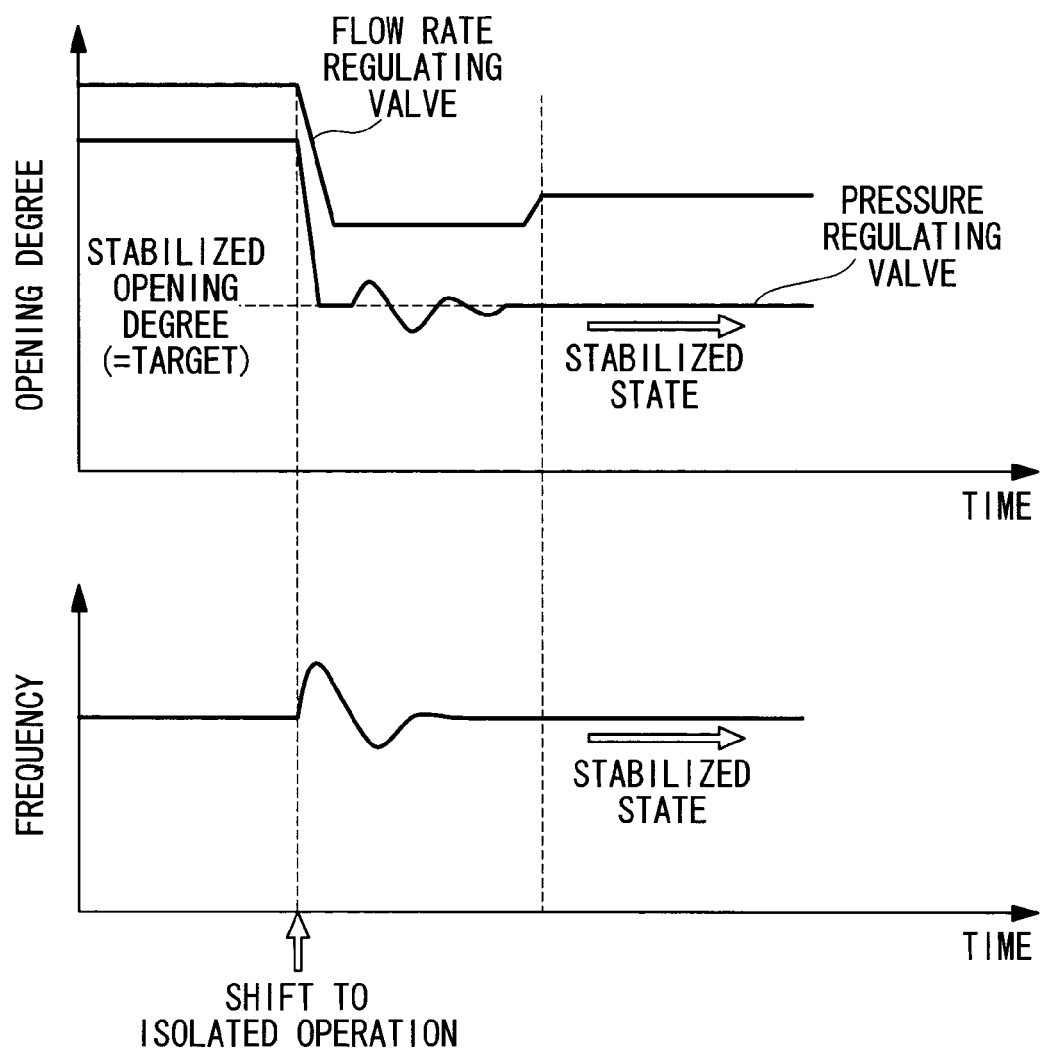
FIG. 7 is a graph showing a change over time in the opening degree of the pressure regulating valve and a temporal change in the frequency of the power system in the plant, in a case where the load-decrease opening degree control according to the first embodiment of the present invention is performed.

FIG. 7 is a graph showing a change over time in the opening degree of the pressure regulating valve 44 and a change over time in the frequency of the power system in the plant 10, in a case where the load-decrease opening degree control according to the first embodiment is performed.

As shown in FIG. 7, the opening degree of the pressure regulating valve 44 varies near the opening degree in a stabilized state (stabilized opening degree), and as this opening degree reaches an appropriate value, the fuel flow rate also becomes appropriate, so that variations in the frequency become smaller.

As described above, upon detection of a load decrease by the load decrease detection part 52, the valve control device 50 according to the first embodiment controls the opening degree of the pressure regulating valve 44 by the pressure control part 56 in accordance with the output of the gas turbine 12 after the load decrease.

The pressure control part 56 according to the first embodiment obtains the fuel demand value in accordance with the GT output demand value and determines the opening degree of the pressure regulating valve 44 on the basis of the fuel demand value. For this purpose, the pressure control part 56 calculates the flow rate of the air to be fed to the compressor 20 on the basis of the GT output demand value, and by using the GT heat balance data, derives the fuel demand value corresponding to the calculated air flow rate, the atmospheric temperature, and the GT output demand value.

Thus, the valve control device 50 according to the first embodiment can precisely determine the opening degree of the pressure regulating valve 44 after the load decrease, and can suppress instability of the output of the gas turbine 12 even when the load rapidly decreases.

In the valve control device 50 according to the first embodiment, it is not essential to use the atmospheric temperature in deriving the fuel demand value by using the GT heat balance data. More specifically, the fuel demand value corresponding to the air flow rate and the output demand value is derived by using the GT heat balance data, with the atmospheric temperature taken as a fixed value. The atmospheric temperature taken as a fixed value may be varied according to the season.

(Second Embodiment)

A second embodiment of the present invention will be described below.

Description of the configuration of the plant 10 according to the second embodiment will be omitted, as it is similar to or the same as the configuration of the plant 10 according to the first embodiment shown in FIG. 1.

Figure 8:
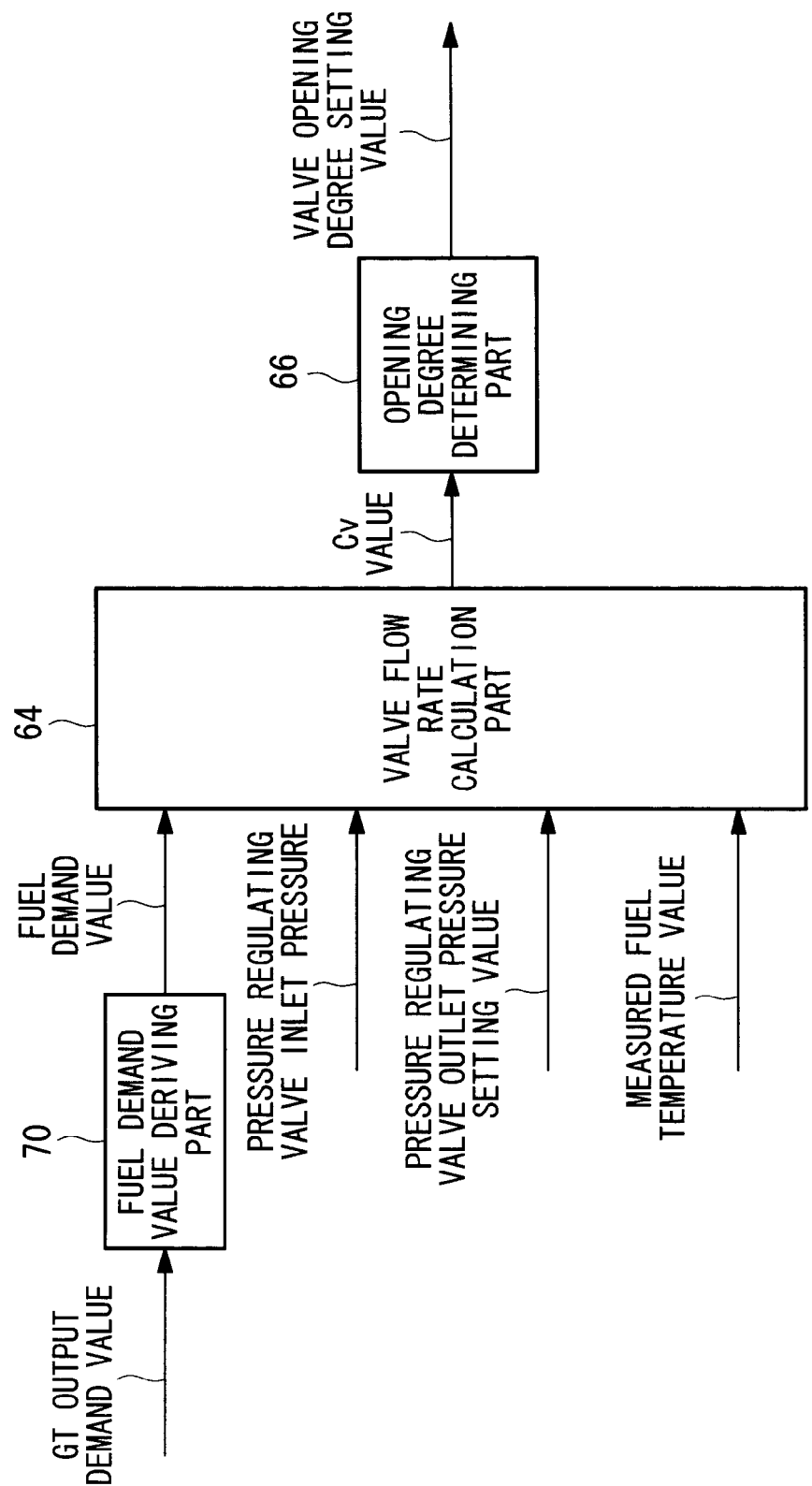
FIG. 8 is a function block diagram showing a function of the pressure control part for performing load-decrease opening degree control according to a second embodiment of the present invention.

FIG. 8 is a function block diagram showing a function of the pressure control part 56 for performing load-decrease opening degree control according to the second embodiment. Components in FIG. 8 that are the same as those in FIG. 5 will be denoted by the same reference signs as in FIG. 5 and description thereof will be omitted.

Table information B (table function) indicating a relation between the GT output demand value and the fuel demand value is stored in a fuel demand value deriving part 70 according to the second embodiment. This table information B is created in advance. When the instruction for execution of the load-decrease opening degree control is received by the pressure control part 56 and the GT output demand value after the load decrease is inputted, the fuel demand value deriving part 70 derives the fuel demand value corresponding to the inputted GT output demand value by using the table information B, and outputs the fuel demand value to the valve flow rate calculation part 64.

Then, the pressure control part 56 according to the second embodiment determines the opening degree of the pressure regulating valve 44 by the valve flow rate calculation part 64 and the opening degree determining part 66, on the basis of the fuel demand value derived by the fuel demand value deriving part 70.

As described above, the pressure control part 56 according to the second embodiment derives the fuel demand value corresponding to the GT output demand value after the load decrease by using the table information B indicating the relation between the GT output demand value and the fuel demand value. Thus, since the amount of calculations performed to determine the opening degree of the pressure regulating valve 44 is reduced, the pressure control part 56 according to the second embodiment can determine the opening degree of the pressure regulating valve 44 after the load decrease in a simple configuration.

(Third Embodiment)

A third embodiment of the present invention will be described below.

Description of the configuration of the plant 10 according to the third embodiment will be omitted, as it is similar to or the same as the configuration of the plant 10 according to the first embodiment shown in FIG. 1.

Figure 9:
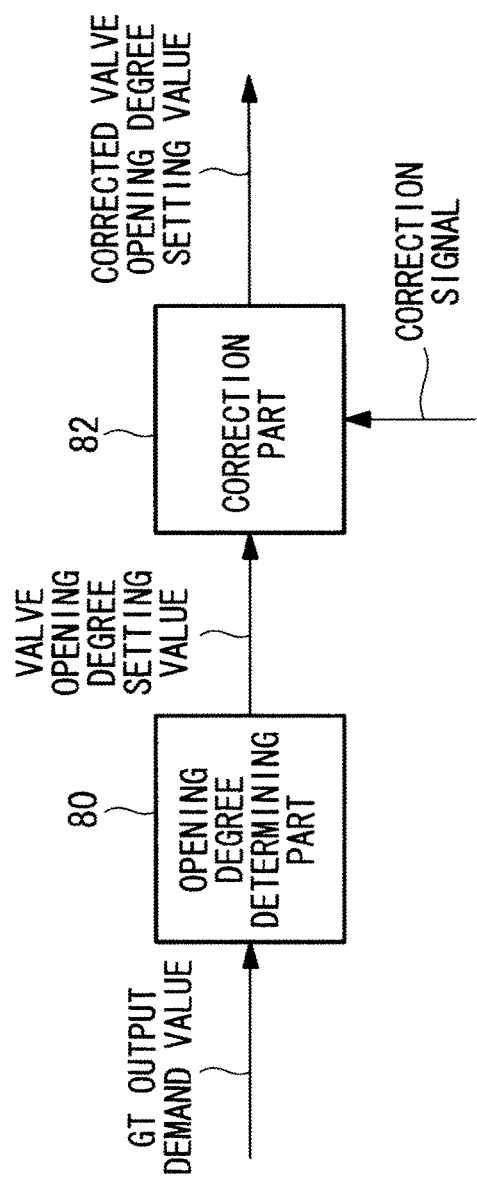
FIG. 9 is a function block diagram showing a function of the pressure control part for performing load-decrease opening degree control according to a third embodiment of the present invention.

FIG. 9 is a function block diagram showing a function of the pressure control part 56 for performing load-decrease opening degree control according to the third embodiment.

The pressure control part 56 according to the third embodiment includes an opening degree determining part 80 and a correction part 82.

Table information C (table function) indicating a relation between the GT output demand value and the opening degree of the pressure regulating valve 44 is stored in the opening degree determining part 80. This table information C is created in advance. When the instruction for execution of the load-decrease opening degree control is received by the pressure control part 56 and the GT output demand value after the load decrease is inputted, the opening degree determining part 80 derives the opening degree of the pressure regulating valve 44 corresponding to the inputted GT output demand value by using the table information C, and outputs the valve opening degree setting value indicating the opening degree to the correction part 82.

The correction part 82 corrects the inputted valve opening degree setting value on the basis of parameters influencing the combustion state in the combustor 22. The above-mentioned parameters include atmospheric temperature, a fuel calorific value, fuel temperature, fuel supply pressure, or etc., each value of which is inputted into the correction part 82 as a correction signal.

For example, a higher atmospheric temperature means a lower air density, hence the output of the gas turbine 12 decreases. Therefore, at high atmospheric temperatures, the correction part 82 corrects the valve opening degree setting value such that the amount of fuel to be supplied to the combustor 22 becomes larger.

A higher fuel calorific value means an increased output of the gas turbine 12. Therefore, at high fuel calorific values, the correction part 82 corrects the valve opening degree setting value such that the amount of fuel to be supplied to the combustor 22 becomes smaller.

A higher fuel temperature means a lower fuel density, hence the output of the gas turbine 12 decreases. Therefore, at high fuel temperatures, the correction part 82 corrects the valve opening degree setting value such that the amount of fuel to be supplied to the combustor 22 becomes larger.

A higher fuel supply pressure means a higher fuel density, hence the output of the gas turbine 12 increases. Therefore, at high fuel temperatures, the correction part 82 corrects the valve opening degree setting value such that the amount of fuel to be supplied to the combustor 22 becomes smaller.

Then, the valve opening degree setting value corrected by the correction part 82 is sent to the pressure regulating valve 44.

As described above, the pressure control part 56 according to the third embodiment derives the opening degree of the pressure regulating valve 44 corresponding to the GT output demand value after the load decrease by using the table information C indicating the relation between the GT output demand value and the opening degree of the pressure regulating valve 44. Thus, since the amount of calculations performed to determine the opening degree of the pressure regulating valve 44 is reduced, the pressure control part 56 according to the third embodiment can determine the opening degree of the pressure regulating valve 44 after the load decrease in a simple configuration.

In addition, since the pressure control part 56 according to the third embodiment corrects the opening degree of the pressure regulating valve 44, derived by using the table information C, on the basis of the parameters which influences the combustion state in the combustor 22, the opening degree of the pressure regulating valve 44 after the load decrease can be precisely determined.

(Fourth Embodiment)

A fourth embodiment of the present invention will be described below.

Description of the configuration of the plant 10 according to the fourth embodiment will be omitted, as it is similar to or the same as the configuration of the plant 10 according to the first embodiment shown in FIG. 1.

A fuel flow rate command value, which is a command value indicating the fuel flow rate, immediately after a shift to isolated operation is under rotational speed control as control based on the rotational speed of the gas turbine 12. For this reason, due to the rotational speed control, the fuel flow rate command value immediately after the shift to isolated operation is a value different from the flow rate for a case of the gas turbine 12 in a stabilized state. Especially when the loss of the load is large, the fuel flow rate command value is suppressed to a flow rate lower than the flow rate in the stabilized state.

Therefore, the pressure control part 56 according to the fourth embodiment derives the fuel demand value by using the fuel flow rate command value as a value corresponding to the output of the gas turbine 12 after the load decrease.

Figure 10:
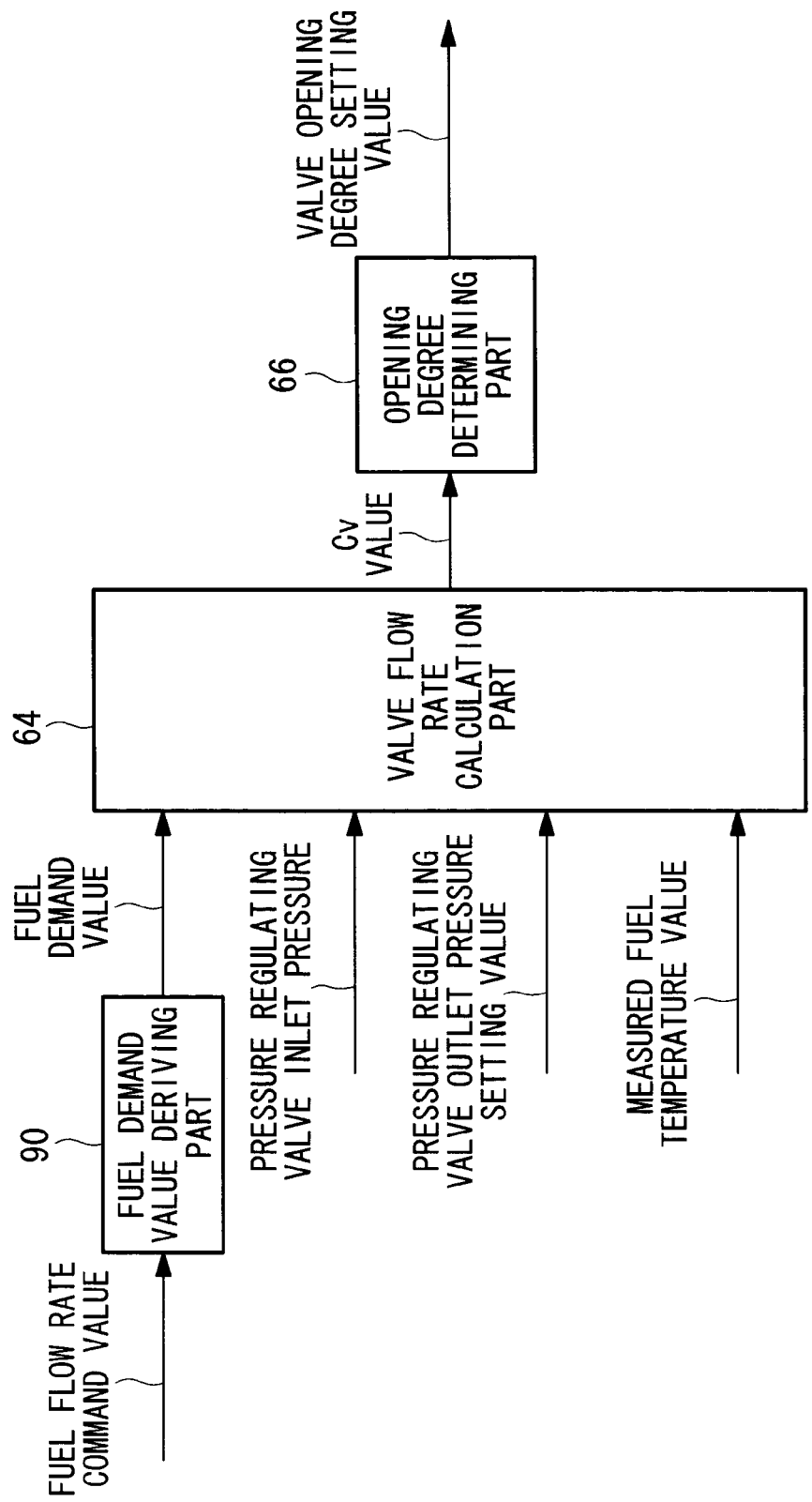
FIG. 10 is a function block diagram showing a function of the pressure control part for performing load-decrease opening degree control according to a fourth embodiment of the present invention.

FIG. 10 is a function block diagram showing a function of the pressure control part 56 for performing load-decrease opening degree control according to the fourth embodiment. Components in FIG. 10 that are the same as those in FIG. 5 will be denoted by the same reference signs as in FIG. 5 and description thereof will be omitted.

Table information D (table function) indicating a relation between the fuel flow rate command value and the fuel demand value is stored in a fuel demand value deriving part 90 according to the fourth embodiment. This table information D is created in advance. When the instruction for execution of the load-decrease opening degree control is received by the pressure control part 56 and the fuel flow rate command value after the load decrease is inputted, the fuel demand value deriving part 90 derives the fuel demand value corresponding to the inputted fuel flow rate command value by using the table information D, and outputs the fuel demand value to the valve flow rate calculation part 64.

Then, the pressure control part 56 according to the fourth embodiment determines the opening degree of the pressure regulating valve 44 by the valve flow rate calculation part 64 and the opening degree determining part 66, on the basis of the fuel demand value derived by the fuel demand value deriving part 90.

As described above, since the pressure control part 56 according to the fourth embodiment derives the fuel demand value corresponding to the fuel flow rate command value after the load decrease, by using the fuel flow rate command value, the opening degree of the pressure regulating valve 44 after the load decrease can be precisely determined. Since the opening degree of the flow rate regulating valve 42 corresponds to the fuel flow rate, the pressure control part 56 according to the fourth embodiment may use a opening degree command value of the flow rate regulating valve 42 instead of the fuel flow rate command value.

Although the present invention has been described above using the embodiments, the technical scope of the present invention is not limited to the scope described in the above embodiments. Various modifications or improvements can be made to each of the embodiments within the scope of the present invention, and such modified or improved forms are also included in the technical scope of the present invention.

REFERENCE SIGNS LIST

10 Plant
20 Compressor
22 Combustor
24 Turbine
42 Flow rate regulating valve
44 Pressure regulating valve
50 Valve control device
52 Load decrease detection part
56 Pressure control part
60 IGV opening degree calculation part.

The invention claimed is:

1. A valve control device provided in a gas turbine, the gas turbine comprising:
   a combustor for generating combustion gas by combusting fuel;
   a turbine driven by the combustion gas generated by the combustor;
   a flow rate regulating valve for regulating a flow rate of the fuel to be supplied to the combustor; and
   a pressure regulating valve disposed upstream of the flow rate regulating valve in a fuel passage for supplying the fuel to the combustor, for regulating a fuel pressure,
   wherein the valve control device controls at least an opening degree of the pressure regulating valve,
   the valve control device comprising:
   a detection section for detecting a load decrease of the gas turbine; and
   a pressure control section for throttling the opening degree of the pressure regulating valve to an unclosed opening degree on the basis of an output demand value of the gas turbine after the load decreases when the detection section detects the load decrease,
   wherein the pressure control section obtains a fuel demand value indicating an amount of the fuel to be supplied to the combustor on the basis of the output demand value for the gas turbine after the load decrease, and determines the opening degree of the pressure regulating valve on the basis of the fuel demand value,
   an air flow rate calculation section for calculating a flow rate of air to be fed to a compressor on the basis of the output demand value, the compressor introducing compressed air into the combustor,
   wherein the pressure control section derives the fuel demand value corresponding to the air flow rate calculated by the air flow rate calculation section, atmospheric temperature, and the output demand value, by using heat balance data indicating at least one of state values at inlets and outlets of components constituting the gas turbine.

2. The valve control device according to claim 1, wherein the pressure control section controls the opening degree of the pressure regulating valve on the basis of the gas turbine output demand value after the load decrease when the amount of the load decrease exceeds a predetermined threshold value.

3. A gas turbine comprising:
   a combustor for generating combustion gas by combusting fuel;
   a turbine driven by the combustion gas generated by the combustor;
   a flow rate regulating valve for regulating flow rate of the fuel to be supplied to the combustor;
   a pressure regulating valve disposed upstream of the flow rate regulating valve, for regulating fuel pressure; and
   a valve control device configured in accordance with claim 1, for controlling the opening degree of the pressure regulating valve.

4. A valve control method provided in a gas turbine, the gas turbine comprising:
   a combustor for generating combustion gas by combusting fuel;
   a turbine driven by the combustion gas generated by the combustor;
   a flow rate regulating valve for regulating a flow rate of the fuel to be supplied to the combustor; and
   a pressure regulating valve disposed upstream of the flow rate regulating valve in a fuel passage for supplying the fuel to the combustor, for regulating a fuel pressure,
   wherein the valve control method controls at least an opening degree of the pressure regulating valve,
   the valve control method comprising:
   a first step of detecting a load decrease of the gas turbine; and
   a second step of throttling the opening degree of the pressure regulating valve to an unclosed opening degree on the basis of a gas turbine output demand value after the load decreases when the load decrease is detected,
   obtaining a fuel demand value indicating an amount of the fuel to be supplied to the combustor on the basis of the output demand value for the gas turbine after the load decrease, and determining the opening degree of the pressure regulating valve on the basis of the fuel demand value, calculating a flow rate of air to be fed to a compressor on the basis of the output demand value, the compressor introducing compressed air into the combustor, and deriving the fuel demand value corresponding to the calculated air flow rate, atmospheric temperature, and the output demand value, by using heat balance data indicating at least one of state values at inlets and outlets of components constituting the gas turbine.

\* \* \* \* \*